Feb. 3, 1953 W. R. AKANS 2,627,386
COLLAPSIBLE CAMERA TRIPOD
Filed Nov. 17, 1950 2 SHEETS—SHEET 2
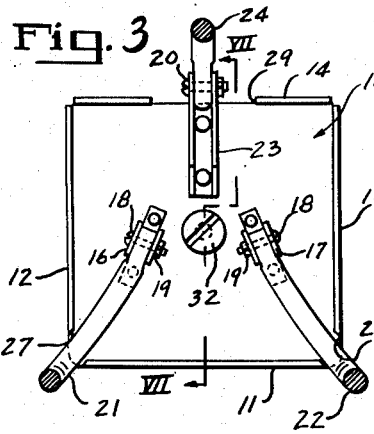
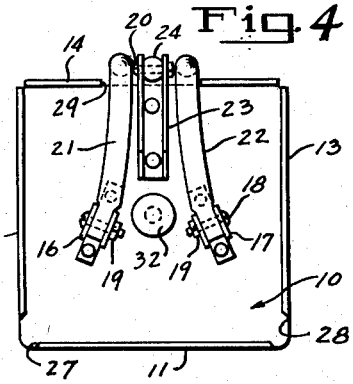
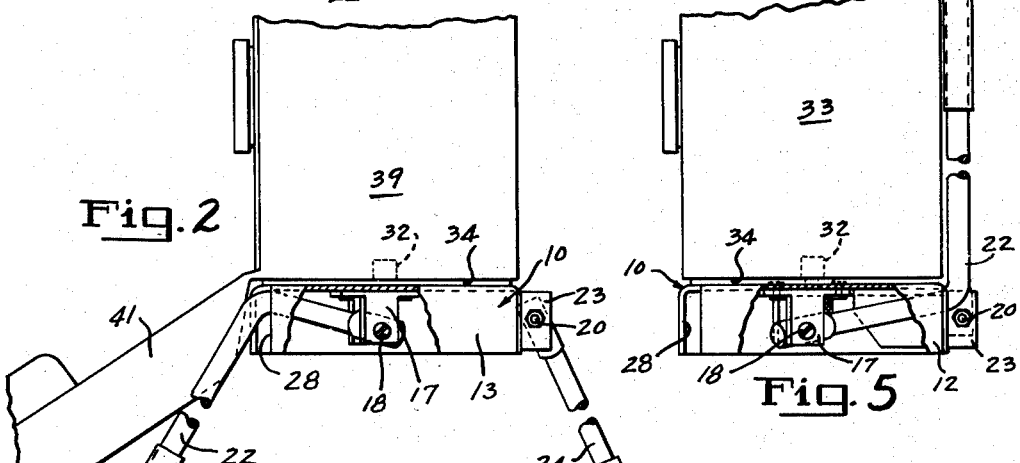
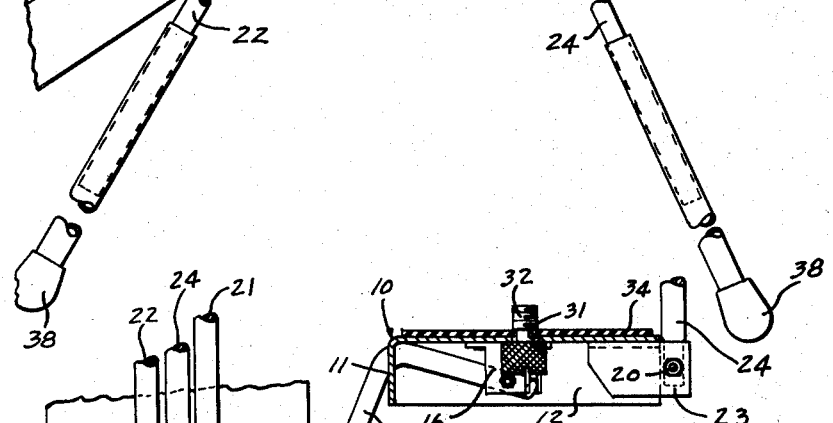
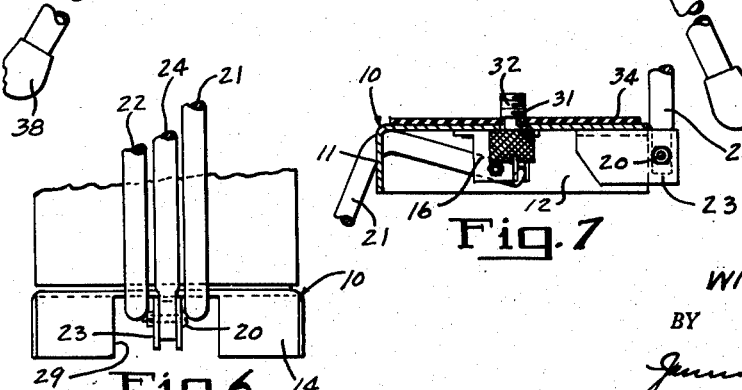
INVENTOR.
WILLIAM R. AKANS
BY
Jennings & Carter
ATTORNEYS Patented Feb. 3, 1953

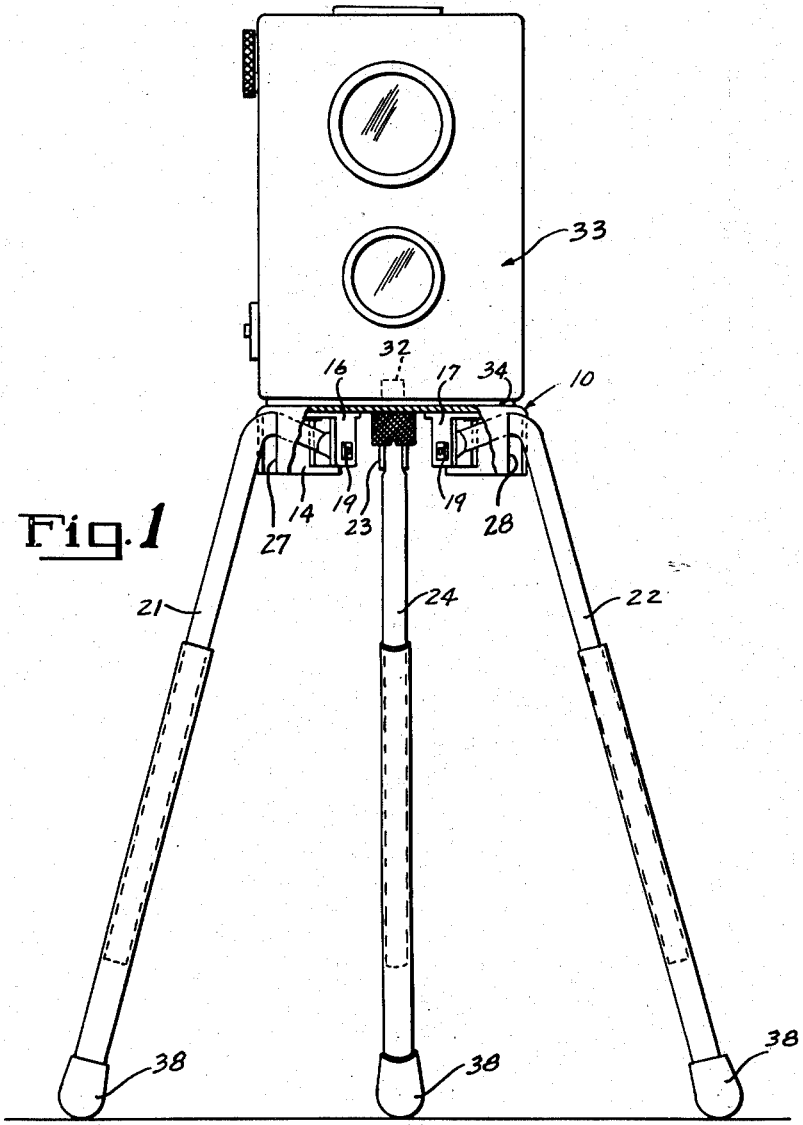

2,627,386

UNITED STATES PATENT OFFICE 2,627,386

COLLAPSIBLE CAMERA TRIPOD

William R. Akans, Birmingham, Ala.

Application November 17, 1950, Serial No. 196,319

6 Claims. (Cl. 248—168)

This invention relates to a collapsible camera tripod and has for its principal object the provisions of such a tripod having legs which may be folded up alongside the camera and occupy a minimum of space when the tripod is not in use.

A further object is to provide a camera tripod of the character designated embodying a head plate and legs which are collapsible to a position alongside the camera thus permitting the head plate to be used as a supporting base when the legs are moved to the collapsed position.

A further object is to provide a camera tripod of the character designated having legs foldable alongside the camera to occupy a minimum of space, whereby it is unnecessary to remove the camera from the tripod when placing the camera in its carrying case, or when taking a picture.

A still further object of my invention is to provide a camera tripod of the character designated which shall be simple of construction and economical of manufacture and one which may be readily adapted for use with a camera.

A device embodying features of my invention is illustrated in the accompanying drawings forming a part of this application in which:

Fig. 1 is a front elevational view of the device with a camera mounted thereon;

Fig. 2 is a side elevational view partly broken away and in section showing the legs in erected position;

Fig. 3 is a bottom view showing the legs in erected position with the legs broken away and in section;

Fig. 4 is a bottom view showing the legs in collapsed position;

Fig. 5 is a side elevational view partly broken away and in section showing the legs in collapsed position;

Fig. 6 is a rear elevational view partly broken away and in section showing the legs in collapsed position; and, Fig. 7 is a sectional view taken along the line VII—VII of Fig. 3.

Referring now to the drawings for a better understanding of my invention I show a head plate 10 having downturned flanges 11, 12, 13 and 14. Secured to the bottom of the head plate 10, and equi-distant from the center thereof, are transversely spaced brackets 16 and 17 in the form of channels. Pivotally mounted in the channels of the brackets 16 and 17 by means of bolts 18 and nuts 19 are generally L-shaped legs 21 and 22 respectively. Secured to the bottom of the head plate 10 on the opposite side of the center from the brackets 16 and 17 and extending in a direction normal to the vertical plane passing through the center of the brackets 16 and 17 is a bracket 23. Pivotally connected at the rear of the bracket 23 by means of a bolt 20 is a leg member 24.

The forward portion of the flanges 12 and 13 and the end portions of the flange 11 are cut away as at 27 and 28 to provide corner openings for receiving the legs 21 and 22 when they are moved to the erected position as shown in Figs. 1 and 3. The central portion of the rear flange 14 is cut away as at 29 to form a relatively wide opening permitting the rear end of the bracket 23 to extend rearwardly from the head plate 10. Also, the opening 29 is of a sufficient width to receive the legs 21 and 22 when moved to the folded position, as shown in Figs. 4 and 6.

The pivot points of the brackets 16 and 17 are spaced from the bottom of the head plate 10, as shown in Figs. 1, 2, 5 and 7 to form an included angle, with relation to the horizontal plane passing through the pivot point and parallel to the head plate, which is substantially equal to the included angle formed by the arms of each of the generally L-shaped legs 21 and 22 less 90°. This construction permits the legs 21 and 22 to lie substantially perpendicular to the head plate and parallel to the leg 24 when in folded position, as shown in Fig. 5, and to extend outwardly from the sides of the head plate 10 when in the erected position, as shown in Figs. 1 and 2. In other words, the legs extend at right angles to the head plate when in the collapsed position and form an angle with respect to the head plate 10 when in the erected position which is greater than 90°. When the legs 21 and 22 are moved to the collapsed position the lower ends thereof lie wholly within the confines of the downturned flanges of the head plate 10. Also, the brackets 16, 17 and 23 and their pivot points all lie within the confines of the downturned flanges of the head plate 10, thus permitting the head plate 10 to be used as a supporting base when the legs are in collapsed position.

The head plate 10 is provided with an opening 31 at the center thereof for receiving the usual upstanding camera attaching screw 32. To provide a smooth surface between the head plate 10 and the camera 33 a suitable sheet of material 34, such as rubber, may be secured to the top surface of the head plate 10.

The legs 21 and 22 are bent or curved and the brackets 16 and 17 are so positioned that when the legs 21 and 22 are moved to the erected position the legs fit in the corner openings 27 and 28, and when the legs are moved to the collapsed or folded position the legs fit in the opening 29 of the flange 14 on opposite sides of the bracket 23 from each other. The brackets 16 and 17 are so positioned with respect to the forward flange 11, that each channel is directed slightly inwardly of the adjacent forward corners thereof.

The legs 21 and 22 are bent, as shown in Figs. 3 and 4 so that, when in collapsed position, the bent portions thereof are curved inwardly toward the vertical plane which passes through the center of the head plate normal to the flanges 11 and 14. Also, when in the erected position, the bent portion of the legs 21 and 22 are curved outwardly from the vertical plane which passes through the center of the head plate and is normal to the flanges 11 and 14.

The legs 21, 22 and 24 may be provided with rubber tips 38 to prevent slippage of the stand. Also, the legs may be in the form of telescoping sections as shown in Figs. 1, 2 and 5, to permit the stand to be raised or lowered as desired. To tilt or adjust the camera in vertical positions the leg 24 may be moved inwardly or outwardly as desired. That is, to tilt the lens of the camera upward the leg 24 is moved outwardly and to tilt the lens downward the leg 24 is moved inwardly.

In Fig. 2, I show the stand secured to a camera case 39 having a removable front cover 41. With my camera stand, it is not necessary to remove the camera from the carrying case 39 for picture taking. The front cover 41 of the carrying case is lowered, as shown in Fig. 2 and the picture is taken with the camera remaining in the case. When the camera is not in use the legs are folded upwardly against the rear of the case.

From the foregoing it will be seen that I have devised an improved camera tripod which may be readily moved to an inconspicuous collapsed position thus making the tripod a compact part of the camera for easy portability. By constructing the legs and their pivot points so that they lie wholly within the confines of the downturned flanges of the head plate, the base of the head plate may be used as a stand when the legs are moved to the collapsed position.

It will also be seen that by providing generally L-shaped legs 21 and 22 which form an obtuse angle with respect to the head plate 10, when in the erected position, a very sturdy camera stand is provided.

While I have shown my invention in but one form, it will be obvious to those skilled in the art that it is not so limited, but is susceptible of various changes and modifications without departing from the spirit thereof, and I desire therefore, that only such limitations shall be placed thereupon as are specifically set forth in the appended claims.

What I claim is:

1. In a camera tripod, a polygonal head plate, a pair of transversely spaced brackets secured rigidly to the bottom of said head plate and equally spaced from the center thereof, each bracket defining a channel directed slightly inwardly of the adjacent forward corner of the head plate, generally L-shaped legs each having its shorter arm pivotally connected to one of said brackets in said channel, a third bracket secured rigidly to the bottom of said head plate on the opposite side of the center from the first mentioned brackets and extending rearwardly of the head plate, a leg pivotally connected to said third bracket outwardly of said head plate and foldable upwardly perpendicular to the head plate, said generally L-shaped legs being bent to fold upwardly alongside the last mentioned leg.

2. In a collapsible camera tripod, a substantially rectangular head plate, a pair of transversely spaced brackets secured rigidly to the bottom of said head plate and equally spaced from the center thereof, said brackets being positioned slightly to one side of the center of the head plate so that the vertical plane joining said brackets is parallel to two sides of the head plate, said brackets defining channels directed outwardly toward the adjacent side of the head plate which is parallel to the vertical plane joining said brackets, generally L-shaped legs each having its shorter arm pivotally connected to one of said brackets in said channel, a third bracket secured rigidly to the bottom of said head plate, said third bracket being on the opposite side of the center from the first mentioned brackets and defining channels extending outwardly therefrom in a direction normal to the vertical plane joining said first mentioned brackets, a leg pivotally connected to said third bracket outwardly of said head plate and foldable upwardly perpendicular to the head plate, said generally L-shaped legs being bent to curve inwardly, when in the collapsed position, toward said third bracket and to fold upwardly alongside the last mentioned leg and to curve outwardly of the side toward which said first mentioned brackets are directed when in erected position.

3. In a camera tripod a polygonal head plate, a pair of transversely spaced brackets secured rigidly to the bottom of said head plate and equally spaced from the center thereof, said brackets lying slightly forward of the center and defining channels directed slightly inwardly of the forward corners of the head plate, generally L-shaped legs each having its shorter arm pivotally connected to one of said brackets in said channel, said shorter arm being of a length to span the distance from the pivot point thereof to a point outwardly of the rearmost edge of said head plate, a third bracket secured rigidly to the bottom of said head plate rearwardly of the center thereof and extending rearwardly of the head plate, a leg pivotally connected to said third bracket outwardly of said head plate and foldable upwardly perpendicular to the head plate, said generally L-shaped legs being bent to fold upwardly alongside and parallel to the last mentioned leg.

4. In a collapsible camera tripod, a substantially rectangular head plate having downturned flanges at the sides thereof, said flanges being cut away at the forward corners of the head plate and adjacent the center of the rearmost flange, a pair of transversely spaced brackets secured to the bottom of said head plate slightly forward of the center and equally spaced therefrom, said brackets defining channels directed slightly inwardly of the adjacent forward corners of the head plate, generally L-shaped legs each having its shorter arm pivotally connected to one of said brackets in said channel, a third bracket secured to the bottom of said head plate on the opposite side of the center from the first mentioned brackets and extending rearwardly of the head plate, a leg pivotally connected to said third bracket adjacent the outer end thereof and foldable upwardly perpendicular to the head plate, said generally L-shaped legs being bent to fold upwardly alongside the last mentioned leg and fit in said cut away portion of the rearmost flange and to fold outwardly and forwardly and fit in adjacent cut away portions at the forward corners of the head plate.

5. A collapsible camera tripod as defined in claim 4 in which the pivot points of the generally L-shaped legs are spaced from the head plate forming an included angle, with relation to the horizontal plane passing through said pivot points and parallel to the head plate, which is substantially equal to the included angle formed by the arms of each of the generally L-shaped legs less 90°.

6. A collapsible camera tripod as defined in claim 4 in which the transversely spaced brackets, pivot points for said transversely spaced brackets and the lower portions of the legs lie wholly within the confines of the downturned flanges when said legs are folded upwardly perpendicular to the head plate.

WILLIAM R. AKANS.

REFERENCES CITED

The following references are of record in the file of this patent:

UNITED STATES PATENTS

| Number | Name | Date |
|---|---|---|
| 663,804 | Buder | Dec. 11, 1900 |
| 821,335 | Butler | May 22, 1906 |
| 1,803,534 | Leevo | May 5, 1931 |
| 2,531,259 | Cudini | Nov. 21, 1950 |